United States Patent
Lai et al.

(10) Patent No.: US 10,023,311 B2
(45) Date of Patent: Jul. 17, 2018

(54) AUTOMATIC PAINTING SYSTEM WITH DRONE, USER INTERFACE AND COMPUTER VISION

(71) Applicant: International Business Machines Corporation, Armonk, NY (US)

(72) Inventors: Jui-Hsin Lai, White Plains, NY (US); Yu Ma, White Plains, NY (US); Conglei Shi, White Plains, NY (US); Yinglong Xia, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/066,708

(22) Filed: Mar. 10, 2016

(65) Prior Publication Data

US 2017/0259920 A1 Sep. 14, 2017

(51) Int. Cl.
| | | |
|---|---|---|
| *B64D 1/18* | (2006.01) | |
| *B64D 47/08* | (2006.01) | |
| *B64C 39/02* | (2006.01) | |
| *G05D 1/00* | (2006.01) | |

(52) U.S. Cl.
CPC .............. *B64D 1/18* (2013.01); *B64C 39/024* (2013.01); *B64D 47/08* (2013.01); *G05D 1/0011* (2013.01); *G05D 1/0094* (2013.01)

(58) Field of Classification Search
CPC ........ B64D 1/18; B64D 47/08; B64C 39/024; G05D 1/0011; G05D 1/0094
USPC ............................................................ 701/2
See application file for complete search history.

(56) References Cited

U.S. PATENT DOCUMENTS

| 8,409,524 B2 | 4/2013 | Farmer et al. |
| 8,798,922 B2 | 8/2014 | Tilloutson et al. |
| 9,135,737 B2 | 9/2015 | Pershing |
| 2002/0125016 A1 | 9/2002 | Cofield |

(Continued)

FOREIGN PATENT DOCUMENTS

WO 2014/080385 A2 5/2014

OTHER PUBLICATIONS

Stern, "Quadcopter Spray can Mod", Adafruit Industries, Adafruit learning System, Jun. 21, 2015; pp. 1-36.

(Continued)

*Primary Examiner* — Redhwan K Mawari
*Assistant Examiner* — Rodney P King
(74) *Attorney, Agent, or Firm* — Scully, Scott, Murphy & Presser, P.C.; Daniel P. Morris, Esq.

(57) ABSTRACT

A system and method for painting a structure. The system comprises: a computer vision processing system configured to obtain images of a target structure and generate first instructions signals for real time communication to an unmanned aerial vehicle (UAV) having a paint fluid dispensing system provided thereon; a control device at the UAV responsive to received the first instruction signals for controlling real time navigating of the UAV to a location at the target structure; and the computer vision processing system configured to generate second instruction signals for real time communication to the UAV, wherein the control device at the UAV is configured to automatically actuate the paint fluid dispensing system to apply a paint fluid at the location on the target structure in response, the received second instruction signals configuring the UAV to render a desired visual image on the target structure.

21 Claims, 8 Drawing Sheets

(56) References Cited

U.S. PATENT DOCUMENTS

| | | |
|---|---|---|
| 2004/0069866 A1 | 4/2004 | Ireland |
| 2008/0144884 A1* | 6/2008 | Habibi .................. G01C 11/02 |
| | | 382/103 |
| 2010/0286859 A1 | 11/2010 | Feigh et al. |
| 2011/0264311 A1 | 10/2011 | Lee et al. |
| 2012/0175468 A1 | 7/2012 | Zerof |
| 2012/0223181 A1* | 9/2012 | Ciampa .................... B64B 1/62 |
| | | 244/30 |
| 2014/0046589 A1* | 2/2014 | Metzler .................. G01B 21/04 |
| | | 701/514 |
| 2014/0303814 A1 | 10/2014 | Burema et al. |
| 2014/0316614 A1 | 10/2014 | Newman |
| 2015/0274294 A1 | 10/2015 | Dahlstrom |

OTHER PUBLICATIONS

Andreetto et al., "A Cooperative Monitoring Technique Using Visually Servoed Drones", EESME 2015, IEEE Workshop on, Jul. 9-10, 2015, pp. 244-249.

Khozouhee et al., "AAPS—Automated Aero-Painting System", University of Massachusetts Amherst, AAPS Final Report, Apr. 20, 2012, pp. 1-19.

* cited by examiner

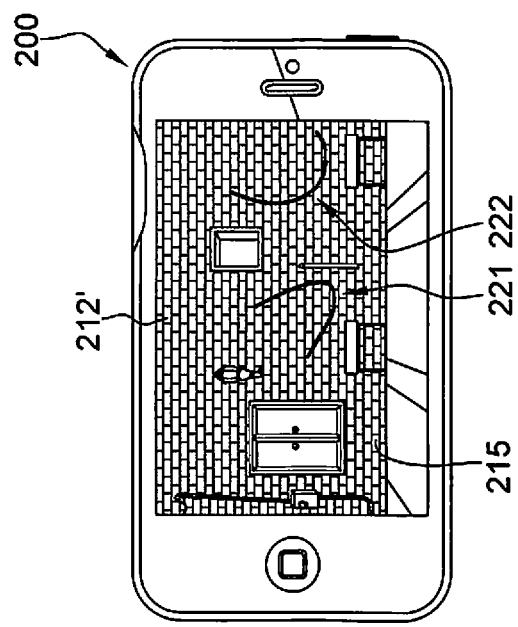
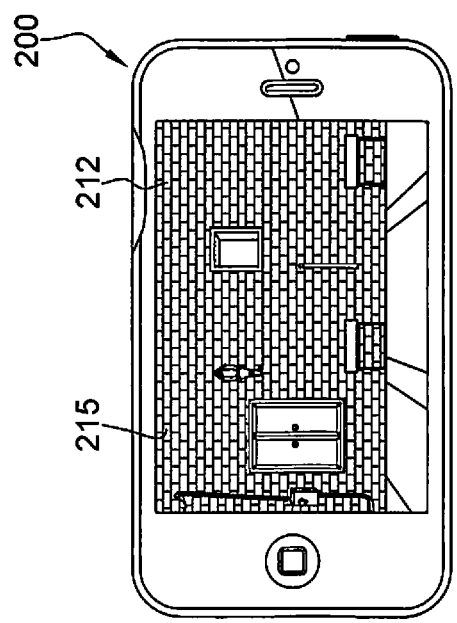

US 10,023,311 B2

AUTOMATIC PAINTING SYSTEM WITH DRONE, USER INTERFACE AND COMPUTER VISION

FIELD

The present disclosure relates to the field of painting outdoor structures generally, and more particularly to a system and method for generating a flying path for unmanned aerial vehicles (UAV) to perform a painting task with a visual result.

BACKGROUND

Painting on a building is dangerous and expensive. There are difficult construction issues and further aesthetic conception issues to be decided.

Remotely piloted UAV or "drones", however, have been used for various applications, e.g., as a monitoring system for power lines and right-of-way using remotely piloted drone, (e.g., see U.S. Pat. No. 4,818,990 A) in which a drone or UAV is used for the maintenance of power lines; as a monitoring system for power lines and right-of-way using remotely piloted drone, (e.g., see CA 1328009 C) in which a drone is used for real-time monitoring system of power lines; as a tool and system for collecting images and image data and for categorizing image data (e.g., see US 20140316614 A1), such as for anomaly detection.

A further use of a remotely piloted drone is as a double surface drone based flow type tri-dimensional visual measurement splicing method (e.g., see CN 101055177 A) which uses a drone for 3D visual measurement based on a two-sided target.

Currently, there is no system or method available to render a drawing on a target structure using a drone with real time monitoring of the painting rendered by the drone.

SUMMARY

A system, method and computer program product for automatically rendering a drawing on a target structure using a drone with real time monitoring of the painting rendered by the drone. The drone's flying may be controlled based on a painting progress wherein a computer vision approach works to automatically refine and navigate the flying path based on the painting progress, and automatically evaluate the painting results with referencing to a target image/painting.

In accordance with one aspect, there is provided a painting system. The painting comprises: an unmanned aerial vehicle (UAV) having a paint fluid dispensing system provided thereon; a controller device at the UAV configured to receive instruction signals for controlling real time navigating of the UAV to a target location at the target structure; and the UAV further responsive to the controller device to configure the UAV to navigate the target structure by traversing the structure along a flight path, and the UAV further responsive to the controller device to configure the UAV to automatically actuate the paint fluid dispensing system to apply paint fluid at a location on the target structure, wherein the UAV paints a desired visual image on the target structure.

In another embodiment, there is provided a method for painting a target structure. The method comprises: receiving, at a processor device of an unmanned aerial vehicle (UAV), navigation instruction signals for real time navigating the UAV to a target location at the target structure, the UAV having a paint fluid dispensing system provided thereon; using instructions signals from the processor device to configure the UAV to traverse the target structure along a flight path; and using further instructions signals from the processor device to configure the UAV to automatically activate the paint fluid dispensing system during the traversal along the flight path to apply a paint fluid on the target structure, wherein the UAV paints a desired visual image on the target structure.

In another embodiment, there is provided a method comprising: configuring a computer vision processing system running at a mobile device base station to obtain real-time images of an unmanned aerial vehicle (UAV) relative to a target structure; generating, by a processor device running at the mobile device base station, navigation instructions signals for real time navigating the UAV to a target location at the target structure, the UAV having a paint fluid dispensing system provided thereon; generating, by the processor device running at the mobile device base station, a flight path for the UAV to traverse the target structure and communicating the instructions signals to navigate the UAV to traverse the target structure along the flight path; and wherein the further instructions signals from the processor device are used to configure the UAV to automatically activate the paint fluid dispensing system during the traversal along the flight path to apply a paint fluid on the target structure, wherein the UAV paints a desired visual image on the target structure.

BRIEF DESCRIPTION OF THE DRAWINGS

Various objects, features and advantages of the present invention will become apparent to one skilled in the art, in view of the following detailed description taken in combination with the attached drawings, in which:

FIG. 2A shows an example of a user mobile phone device configured to capture an original digital image of a target structure;

FIG. 2B shows an example of the user's mobile phone device that displays a new target digital image having a desired visual image overlay to be painted;

FIG. 5A shows an example embodiment of minimizing a painting system equipped UAV flight path in which a UAV flight navigation pattern is reduced;

DETAILED DESCRIPTION

Figure 6:
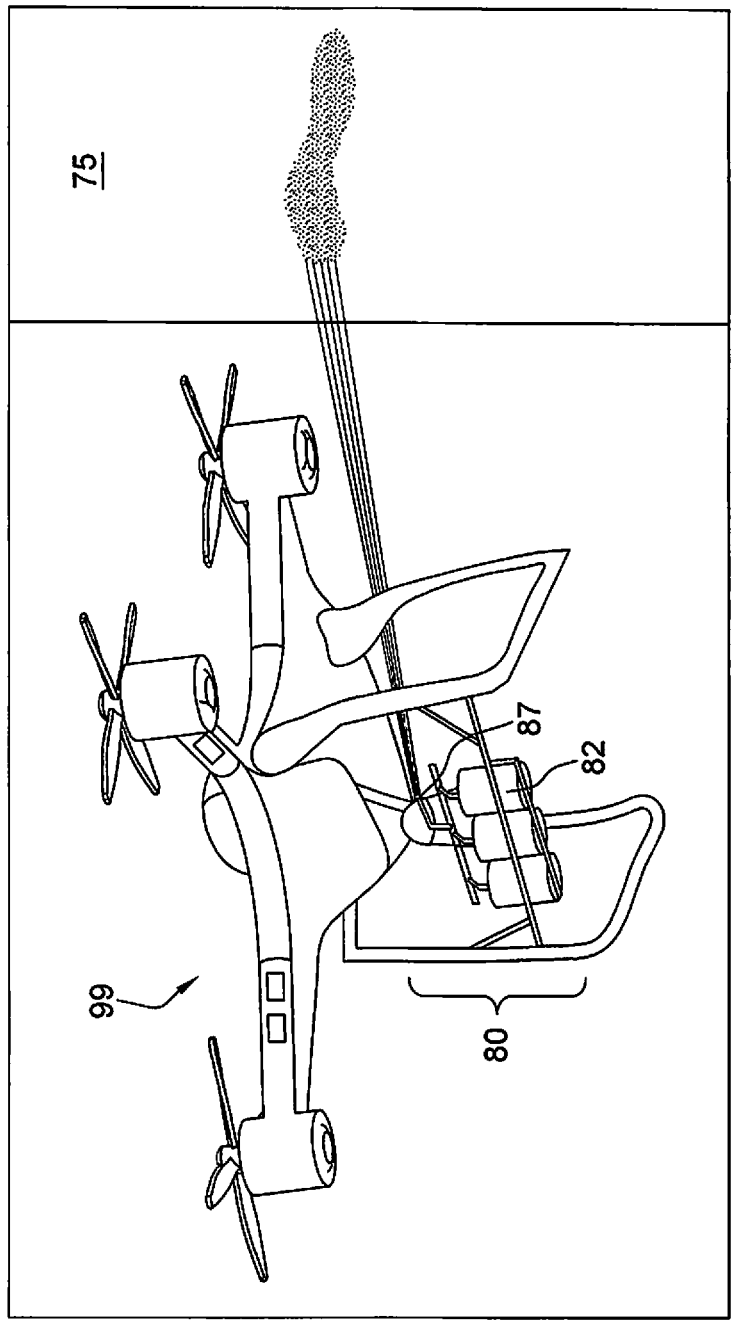
FIG. 6 depicts a system diagram of an unmanned aerial vehicle equipped with an on-board painting system for rendering a visual image on a target structure in one embodiment.

FIG. 6 depicts a system diagram of an unmanned aerial vehicle 99 (interchangeably referred to herein as a "drone")

equipped with an on-board painting system 80 for rendering a visual image on a target structure 75. The drone may be a well-known "Quadcopter" and includes: one or more power takeoff engines and electronic fuel injection system engines for powering the UAV for flight which may include power generators on boards for controlling the speed of motors within the craft; a communications sub-system for receiving control and navigation information including a flight path for traversing a structure; a variety of sensors; a communications system, e.g., at least a receiver for receiving navigation commands from ground equipment, and/or for transmitting data obtained from sensors to ground equipment. Other UAV instrumentation may include for example; a flight controller/processor, a navigation system, an altimeter, one or more cameras for capturing digital image of a target structure, sensors and mapping systems, and a vision tracking device such as a sensor or video processor. In one example, a UAV navigation sub-system may include a radio and amplifiers suitable for UAV system communications, e.g., in radio frequency bands such as UHF, VHF, L-, S-, C-, X- and/or Wi-Fi standard communications, for real time communicating with a drone base station such as a user mobile device, according to any particular UAV communications platform. A power system including power supplies such as batteries may be provided.

In one non-limiting embodiment, depicted in FIG. 6, the drone 99 includes an on-board automated spray paint delivery system 80 includes at least three color paint sources, e.g., RGB paint color sources, in associated containers or canisters 82 that are fixed on the drone, e.g., via a platform or harness. It is understood that while at least three paint sources of Red (R), Green (G) and Blue (B) primary paint color sources are shown for generating any color within an RGB color generation model, it is understood that other paint color sources such as black and white color paints may be provided on the UAV for color generation, as well as colors according to other color schemes (e.g., CMYK color model). The automated spray paint delivery system 80 includes a manifold and spray nozzle 87 connected with each paint canister 82. Each paint color source is electronically activated to supply an amount of color paint to a manifold or mixer device that includes a spray nozzle 87 also actuated under electronic control to spray a desired color of paint on a surface 75 based on the relative amounts of RGB paint being sourced. Via activation commands, the nozzle is chosen or configured to spray and apply paint on a target at a desired granularity, e.g., droplet diameter, and flow rate. In one embodiment, the nozzle is chosen commensurate with the size of the target image/structure, the paint thickness, the distance the UAV is to the target structure when applying paint, and the pattern or image to be painted.

In one non-limiting embodiment, the UAV's communications systems includes an on-board processor and associated memory storage device that receives and stores programmed flight path control information including instructions to navigate the drone along a predetermined path, and including control information and commands to configure the on-board automated paint spraying system 80 for painting a target structure such as an outside wall 75 of a building.

In one embodiment, a user's mobile device, configured as a UAV base station may be equipped with computer vision hardware including image sensors and a processor-based device for acquiring and processing image data, analyzing, and recognizing images and patterns. In one embodiment, computer vision may be implemented for guiding the navigation of a UAV to a pre-determined position according to a received navigation command. That is, via control commands communicated from the mobile device to the drone's on-board navigation system, the drone can be guided to a target position by checking the drone's position from user's mobile device.

Figure 3:
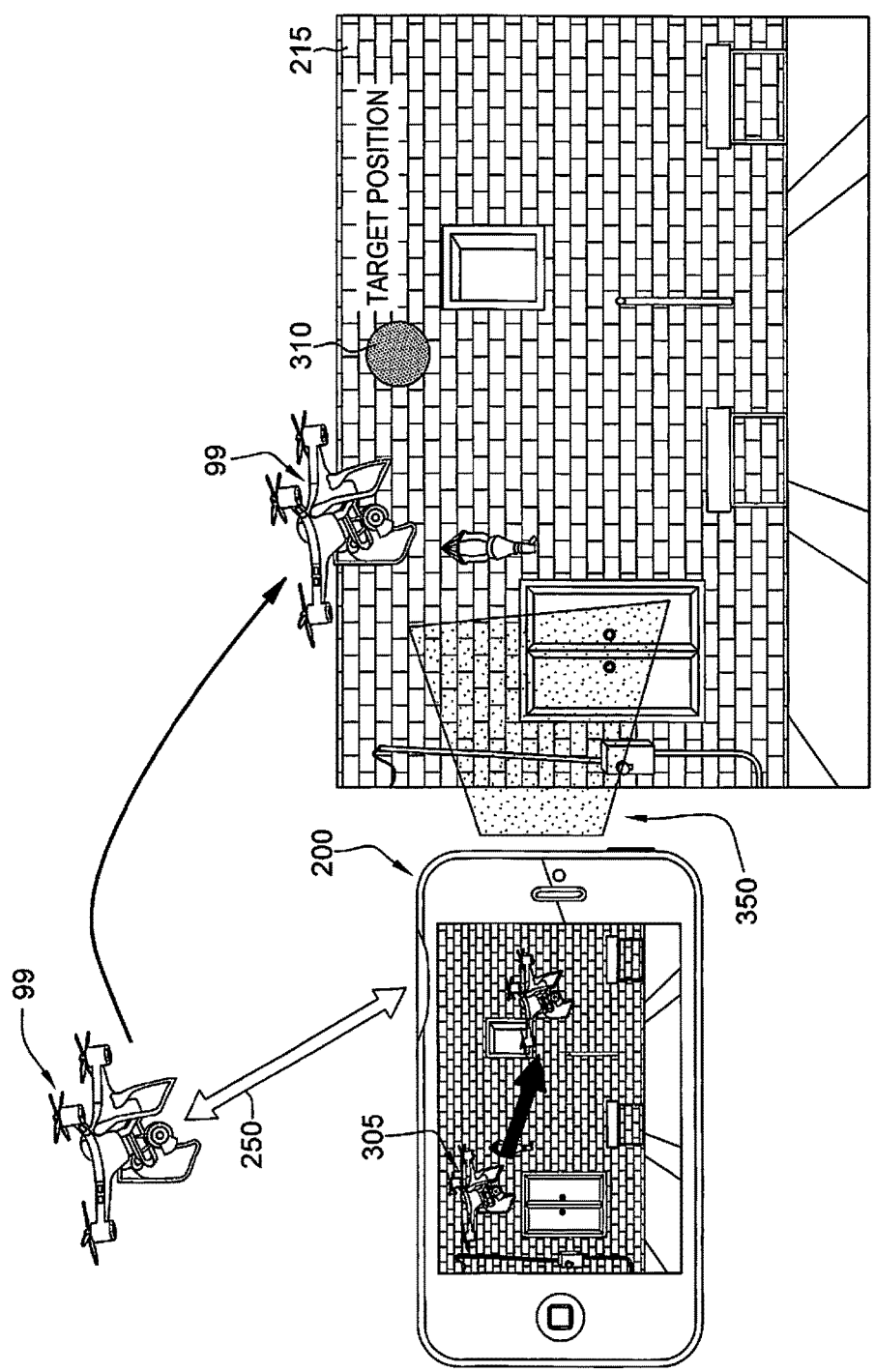
FIG. 3 shows use of computer vision functionality such as provided by sensor or video processing technology to locate from an initial position to a target position the UAV in the space relative to the target structure.

As shown in FIG. 3, the mobile device 200 is configured as a UAV base station equipped with device processor, memory and a transceiver device for transmitting wireless signals 250 with commands or instructions for effecting navigation, according to protocols for navigating the UAV or drone 99 in real time over a flight path, and painting operations. Mobile device base station further receives various signals transmitted from drone 99. The user's mobile device includes computer vision functionality (e.g., sensor or video processing) for real time drone location detection. Such computer vision technology is implemented for UAV navigation and for paint application at the target structure.

Figure 1A:
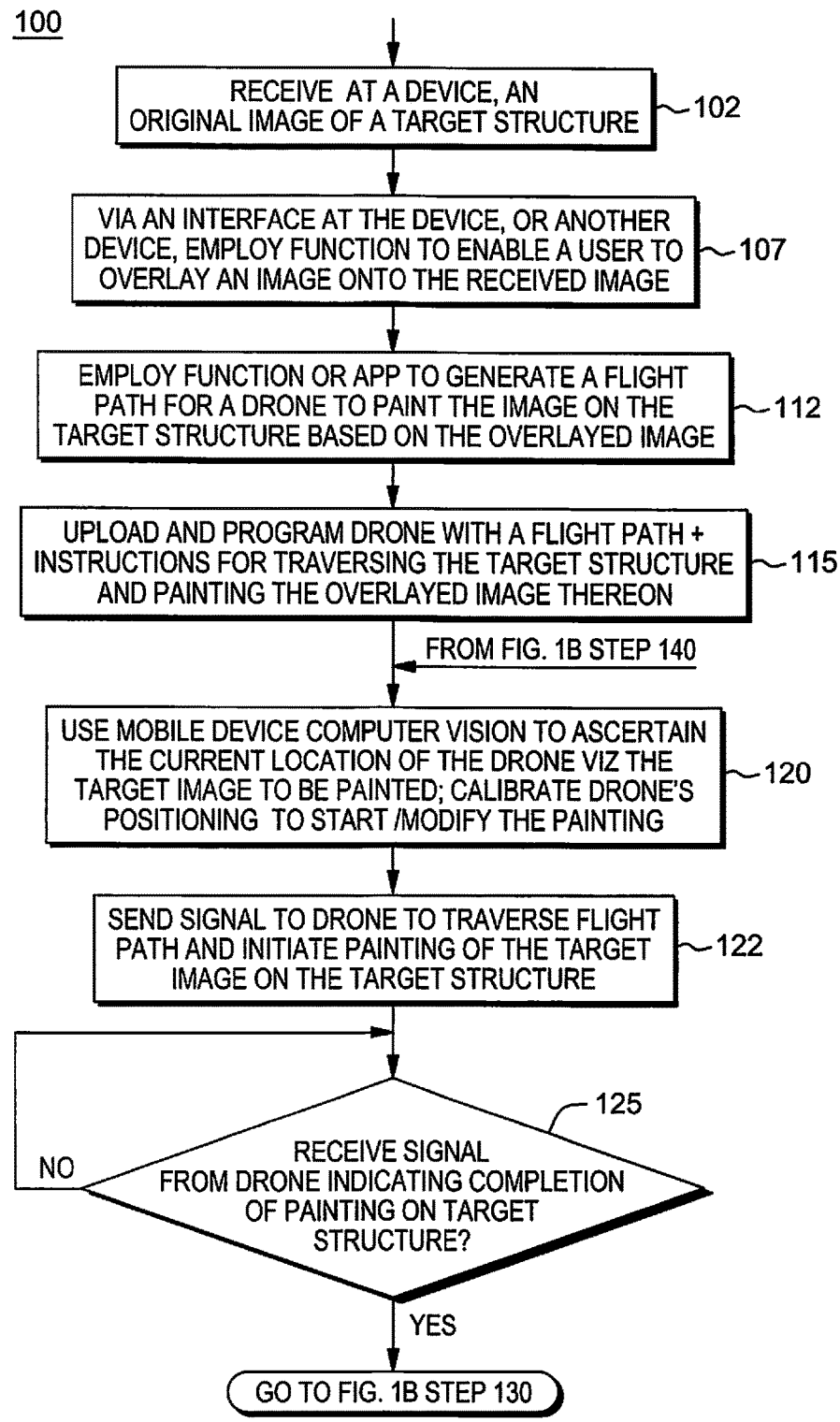
FIGS. 1A and 1B conceptually show a method 100 implemented at a mobile device base station for rendering a target image on a target structure.
Figure 1B:
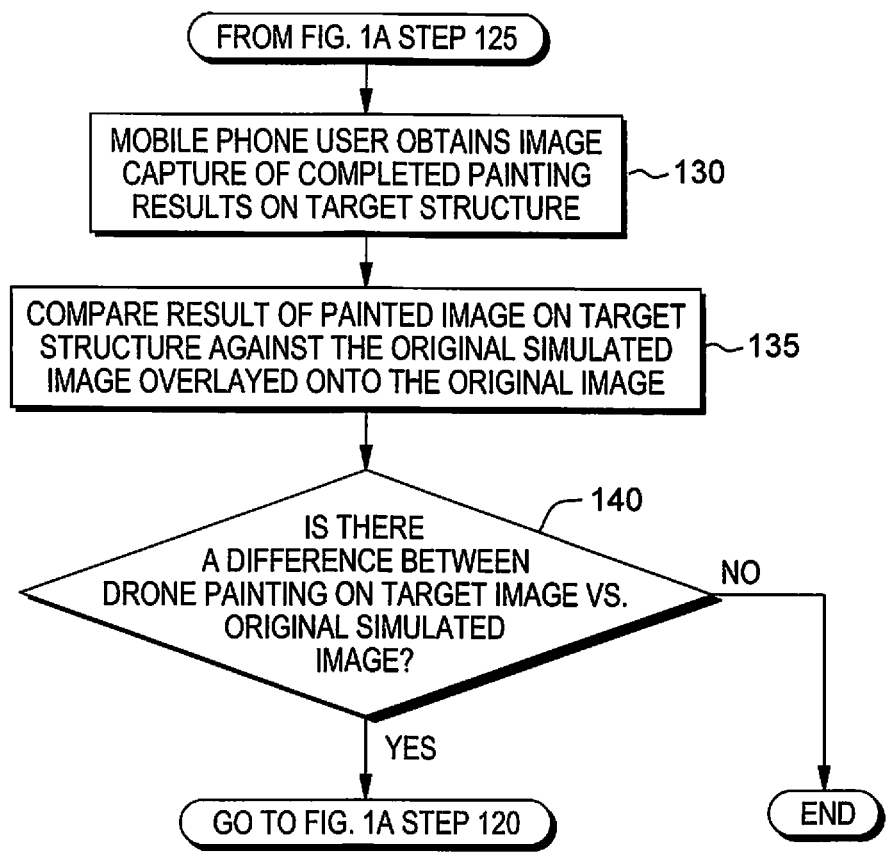

FIGS. 1A and 1B conceptually show a method 100 implemented at the mobile device that employs computer vision at the mobile device for controlling the painting of a desired image or target pattern ("target image") on the target structure using a UAV equipped with a paint application device.

In one embodiment, in FIG. 1A, a method 100 first comprises, at 102, the user capturing a digital image of a target structure, e.g., a building wall or a car, using a mobile device user's digital camera or like image capture device.

In one embodiment, the digital image of the target structure is captured using a camera on a smartphone. FIG. 2A shows an example of a user mobile phone device, e.g., a mobile smartphone device 200, implementing a built-in camera to capture an original digital image 212 of a target structure 215, e.g., a wall of a building.

This image may be stored locally at the camera device or downloaded to a remotely located device via a wired and/or wireless network connection. Then, in FIG. 1A, at 107, at the mobile device itself, or in an off-line process using another computing device, there is run an image or photo editing program, e.g., an application or "app", to overlay a desired pattern, e.g., a target image, visual image or digital drawing, onto the captured digital image 212 of the target structure to create a new image. In one embodiment, the target pattern or image to be overlaid is entered via an editing program running on the camera device, or on the remotely located device. Depending upon the image or photo editing program and the device used to overlay the pattern, a user's finger, pencil or stylus may be used to draw the target image or painting via the user interface.

FIG. 2B additionally shows an example of the user's mobile phone device 200 that displays a new target digital image 222 having a visual overlay, after using an image or photo editing program. That is, via a visual user interface at the camera or a remotely located device, a user may draw a target pattern or desired image as an overlay onto the image of the target structure 215 captured in the original digital image 212. In the example new image 222 shown in FIG. 2, the desired image overlay pattern may comprise any two dimensional object, e.g., such as a cartoon character, a facial image, a scene, or a pattern of solid lines 221, 222 that is to be rendered on the wall of the target structure 215 as depicted in the new displayed image 212'.

Returning back to FIG. 1A, in one embodiment, after the user inputs a drawing or picture for simulating the painting results on the target structure, the method at 112, employs a function to generate a flight path for the drone to paint and render the image on the target structure based on the overlayed image. The flight path may be a customized to traverse and paint the target structure according to a customized grid or raster scan flight path. This generated flight path information for rendering the target image on the target structure may take into account knowledge of the relative position of the paint delivery system spray nozzle and paint delivery trajectory with respect to the drone positioning at the target structure.

In one embodiment, a flight path may be computed for the UAV to traverse the structure in a manner that: 1) minimizes the distance of flying path; 2) evaluates and take into account the battery life for a workload; and/or 3) minimizes a construction time for painting the structure.

Then, at 115, after generating a flight path for the drone to paint the target image on the target structure based on the overlayed image, the generated flight path uploaded to the drone navigation system. For example, using wireless signals, the generated flight path is communicated from the mobile device to the drone.

Additionally uploaded to the drone are signals carrying the instructions that may include: instructions to initiate paint application by the UAV paint application system during traversal along its flight path. Particular instructions may include parameters such as: an amount of a color paint, or a particular combination of color paints to be mixed, for application of the color paint at the current drone location. For example, any target color may be generated according to a combination of RGB primary colors in a RGB color scheme. The instructions may thus include the relative amounts of color paints (e.g., ratios of RGB primary color paint) to achieve the color corresponding to the color at pixel location within the target image.

In one embodiment, using computer vision technology equipped at the user's mobile device 200, a user's mobile device guide the real-time positioning of the UAV to a target or initial position relative to the target structure in response to received user commands, e.g., such as provided via a user communications interface at the mobile device. Thus, at step 120, FIG. 1A, the mobile device's computer vision functionality ascertains the current location of the drone viz. to target image to be painted on the structure. In this manner, the drone's positioning is calibrated to initiate the painting job.

FIG. 3 depicts how the drone 99 is navigated to a target position 310 by checking the drone's current position 305 using computer vision employed from the user's mobile device 200. In one embodiment, the drone 99 can be guided to a target position using computer vision 350, e.g., sensor or video processing, to locate, in real time, the UAV 99 in the space near the target structure 215 and exercise vision functionality. The user's mobile phone camera device captures the drone's position in real-time. In one embodiment, as the mobile phone's camera only captures the drone's position in 2-dimensional format (e.g., X-Y coordinates), the drone is equipped with a distance measuring sensor so that the drone 99 is kept a fixed distance relative to the target structure (e.g., wall) to prevent crashing of the drone against the wall.

In operation, the drone is navigated from an initial position 305 to the target position 310, at which time the drone may then conduct the painting job on the target structure by following the predetermined rendering path as uploaded from user's mobile device. For example, computer vision processing is used to ascertain a current location of the UAV drone viz. the target image to be painted. The user may initiate the mobile device to provide a real time communication of command signal 250 to the UAV 99, over a wireless communications link, to navigate the UAV 99 to the real target structure 215 at a specified position 310 in space proximate the target structure 215. The initial position may correspond to a coordinate shown in the desired overlayed image. In one embodiment, one or more commands are issued to navigate the drone to within a fixed distance close enough to the target structure such that the paint fluid dispensing/application system at the drone may apply an amount of paint on the structure at the target location to begin rendering the desired new target image on the target structure.

Returning to step 122, FIG. 1A, once the drone 99 is located at the target position 310, the mobile device sends a signal 250 to the drone to traverse the predetermined flight path and initiate the painting of the target image on the target structure. The mobile phone remains idle until such time the drone completes the target image rendering on the target structure and receives a wireless signal communication from the drone informing the mobile device that the paint job is finished.

At step 125, FIG. 1A, a determination is made as to whether a signal is received at the drone indicating that drone has completed the painting on the target structure. In one embodiment, the drone may communicate a wireless signal to the mobile device 200 indicating to the user that the drone has completed a traversal of the programmed flight path and has painted the target image on the target structure. Otherwise, the user of the mobile device may view the target structure, e.g., in real-time, and discern that the target image has been completely rendered on the target structure by the drone.

If, at 125, FIG. 1A, the mobile device 200 receives a signal from the drone indicating completion of the target image rendering by the drone on the target structure, or otherwise determines that the target image painting has been completed, the process proceeds to step 130, FIG. 1B, where the mobile phone device obtains an image capture of the completed painting results on the target structure. Otherwise, at 125, the process waits until the rendering is completed.

At 135, FIG. 1B, after obtaining the image capture of the completed painting results on the target structure, the mobile device performs a comparison of the painted image on the target structure against the simulated image overlayed onto the original image of the target structure performed at step 107. In one embodiment, pattern recognition functionality may be used to evaluate the painting of the image on the target structure, e.g., by comparing the current scene of the target with the target scene having the overlaid image in the original image capture. It is assumed for purposes of comparison, that the scale/dimensions of the images of the completed painting results on the target structure captured is commensurate with the scale/dimensions of the simulated image overlayed onto the original image of the target structure.

Then, at 140, the mobile device determines based on the comparison whether there is a difference between the drone painting of the target image and the original image of the target structure having the target image overlayed. In one embodiment, the comparing of the images is with respect to color, shape or size, and/or combinations of such criteria.

If, at 140, it is determined that there is no difference between the drone painting on the target image and the original image of the target structure having the target image overlayed, then the job is finished and the method ends. Otherwise, at 140, if it is determined that there is a difference between the drone painting on the target image and the original image of the target structure having the target image overlayed, then the process returns back to step 120, where the drone may be navigated to its original position 310, and steps 122-140 are repeated until no it is determined that the image are no discernable differences with respect to color, shape or size between the drone painting of the target image and the original image of the target structure having the target image overlayed.

In one embodiment, the mobile device implements computer vision pattern recognition functionality to compare, at the mobile device, two images: the original image of the target structure with the target image overlay and a new image of the target structure with the painted target image with respect to color, shape and size. Based on the comparison, one or more difference regions may be determined. In one embodiment, a determined difference region may be delineated by a rectangle, and the drone may be programmed to again scan, e.g., in a back and forth horizontal direction or a top-down (vertical scan) direction within the corresponding rectangular region at the target structure as delineated in overlaid image and additionally deposit liquid paint on the structure to correct or modify the target image at the corresponding locations in that region.

It is understood that multiple iterations may take place in which the steps 122-140 of FIGS. 1A-1B are performed to finish the painting job. That is, depending upon real time conditions, e.g., wind, and/or the degree of accuracy required of the rendered image on the target structure 214, the method depicted in steps of FIGS. 1A, 1B and FIG. 4 may be repeatedly iterated until the final image is completely rendered.

Figure 4:
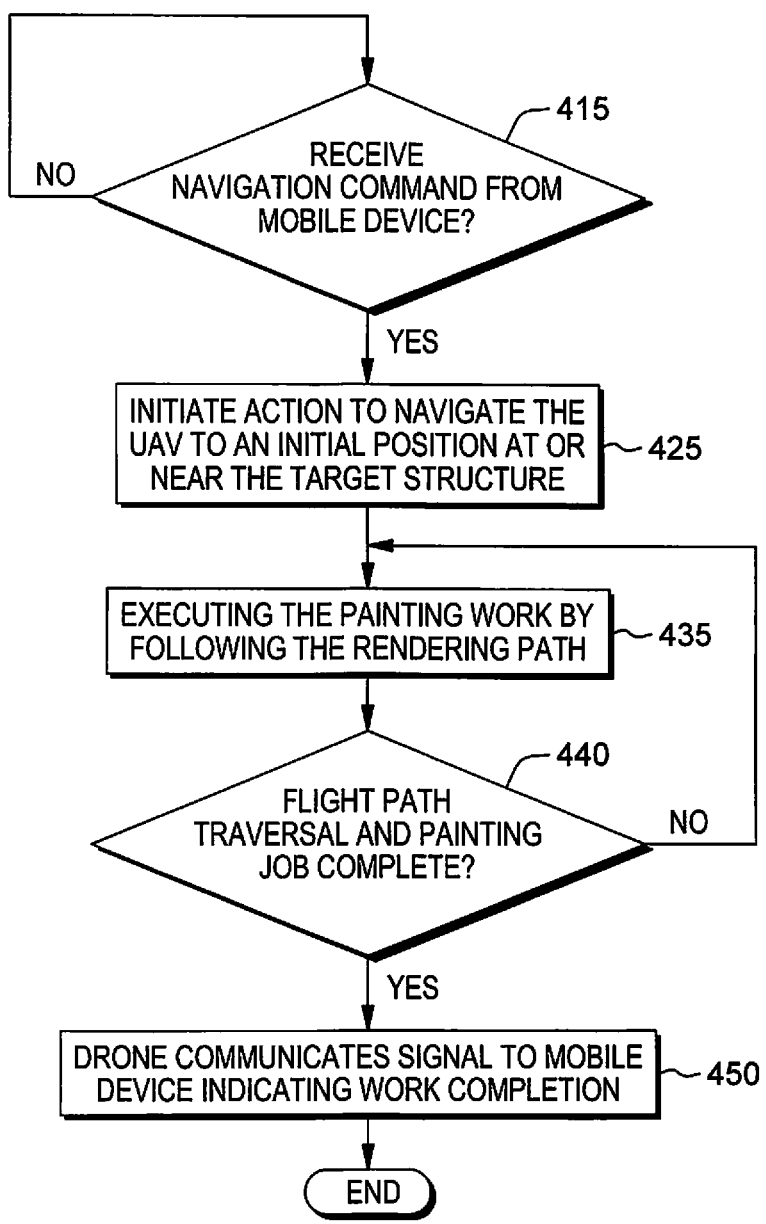
FIG. 4 shows a method implemented at a UAV control system that operates in response to received and/or programmed control and navigation commands to control the drone for painting a structure in one embodiment.

FIG. 4 shows a method 400 implemented at the UAV control processor device for performing navigation and painting operations in response to stored programmed commands executed at the drone and/or in response other control and navigation commands received from the mobile device to control and monitor the drone in real-time.

In one embodiment, the method 400 run at the drone operates first to detect receipt of a navigation command signal received from the mobile device or base station controller. Until such time as the signal is received, the drone is idle at 415. Once a navigation command signal from the mobile device is received at 415, then at 425, the UAV processor responsively navigates the UAV to its initial position 310 at or near target structure. In this embodiment, step 425 depicts the drone receiving of signals in real-time which signals may be wirelessly communicated to the drone from the user's mobile for navigating the drone to the coordinate(s) of an initial target position/location at the target structure in which the drone is to be located to begin its traversal along a predetermined flight path for painting of the target structure. Using computer vision functionality, the user of the mobile device provides commands to steer the drone to its initial position.

Then, at 435, FIG. 4, once located at its target initial position, signals are communicated to the drone from the mobile device base station to execute the painting work (i.e., render the target image on the target structure) as the drone traverses the pre-determined rendering flight path as previously uploaded to and programmed at the drone. In an alternate embodiment, the drone may further receive signals in real-time from the base station for programming the drone to traverse the rendering path along the path according to the known navigation protocols.

Figure 5:
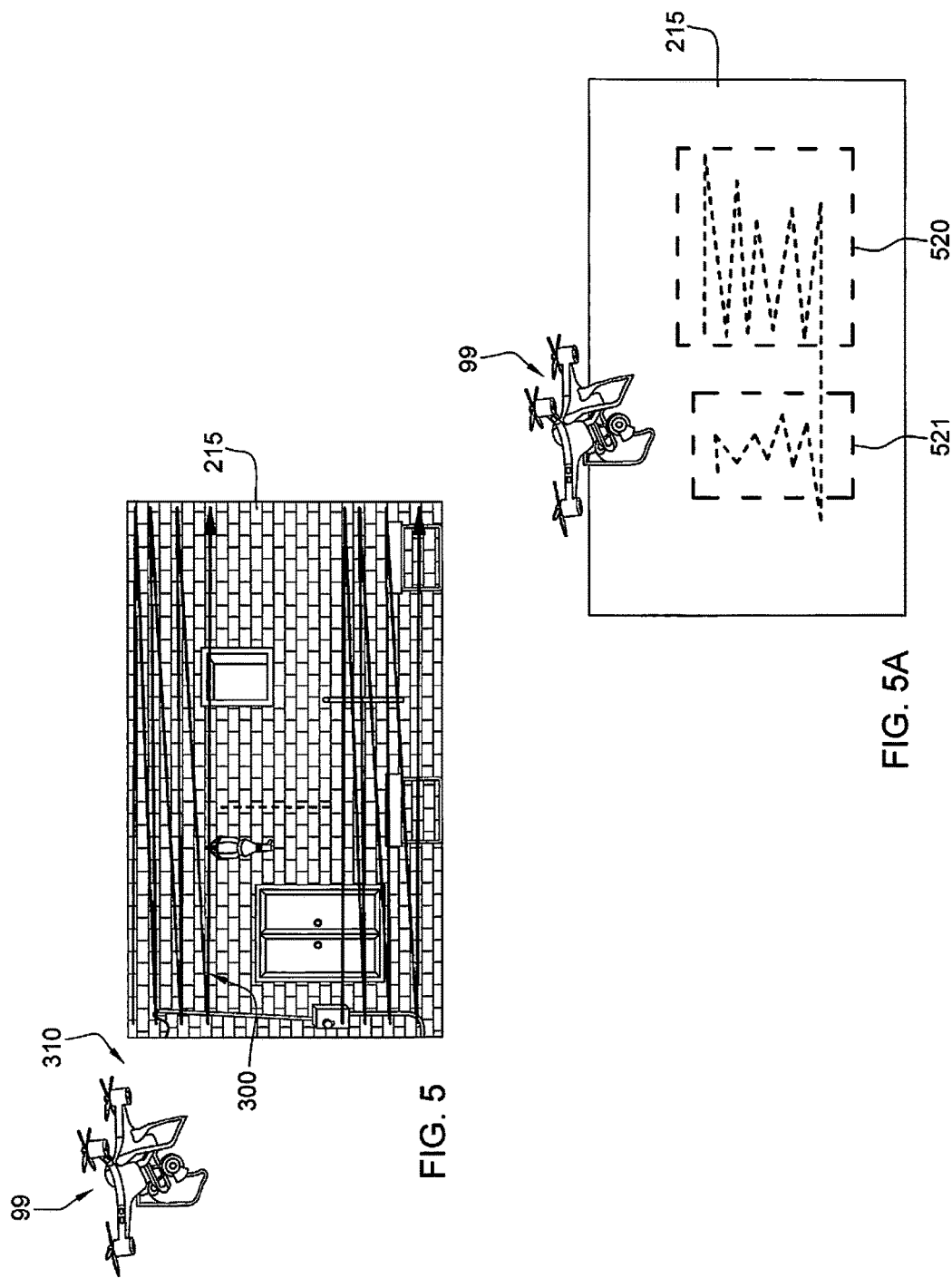
FIG. 5 shows an example embodiment of a grid or raster scan pattern flight path which the drone traverses to apply painting at the target structure in one embodiment.

In one embodiment, as depicted in FIG. 5, the drone is programmed with a navigational flight plan as determined via the mobile device for the mobile device to traverse the target structure 215 along a pattern such as a pre-defined grid scan pattern 300 starting from a pre-determined reference location 310, e.g., a top right corner of the structure.

In the case of programming a flight path at the drone, there may be employed an additional step for granularity measurement, e.g., at step 112, FIG. 1A. Such a step may include causing the drone to fly to a starting position and implementing a granularity measurement by sending a wireless signal from the mobile device base station to command the drone 99 to fly a physical distance for a pre-determined time duration, e.g., flying to a right direction with 1-second time duration, and compare the pixel distance of drone's position on the display of the mobile device. Then, a flying path can be turned into flying directions with a time duration.

Thus, additional method steps may be performed for generating of flight path information for the UAV that includes sending, from the mobile device base station to the controller at the UAV, a signal to locate the UAV to a first position, the first position corresponding to a first location of the UAV displayed via a mobile device display interface using the computer vision technology. Then, the mobile device sends to the controller at the UAV a further signal to command the UAV to fly a physical distance in a single direction for a pre-determined time duration from the first position to a second position, the second position corresponding to a second location of the UAV displayed via the mobile device display. The processor device at the mobile device base station determines a pixel distance between the first and second locations of the UAV displayed via the mobile device display corresponding to the physical difference between the first UAV position and second UAV position. This pixel distance may be compared to a predetermined pixel distance threshold, e.g., 1 pixel, 5 pixels, 10 pixels or 100 pixels, or any amount of pixels there between, as a threshold. The UAV may then be programmed with flying directions for the UAV to traverse the target structure at the pre-determined time duration increments, e.g., if the pixel distance is less than (or equal to) the predetermined pixel distance threshold.

For example, as shown in FIG. 5, in one embodiment, receipt of commands at the UAV 99 responsively causes the UAV to traverse a grid scan pattern 500, e.g., and causes the UAV 99 to traverse back and forth horizontally across the whole length of the structure, or a partial length of the structure, such as in a predefined area, e.g., a rectangle, of the structure. In one embodiment, the drone traverses in a successive zigzag pattern which may be from a top to bottom direction as shown in FIG. 5. In further embodiments, issued commands may cause the UAV 99 to navigate the structure according to a vertical grid scan path 500 that traverses up and down across the whole height of the structure in a successive zigzag pattern which may be in a left to right direction.

In one embodiment, the flying path is according to a grid scan or raster scan method traversal where the drone only traverses a particular area, e.g., a smaller rectangular area.

As different overlay patterns on a target structure may dictate different navigating paths, the flying path of a UAV can be rendered by using an algorithm of Raster Scan, which renders horizontal flight paths from top-right corner to bottom-left corner continuously. Thus, when programmed, a control device may be configured to evaluate the battery life of the UAV and use this information to minimize the UAV work time based on the drawing/images/paintings. In one embodiment, an algorithm of continuous connection will consider the UAV's remaining battery life.

FIG. 5A shows an example embodiment of minimizing a UAV flight path in which a UAV flight navigation pattern may be a variation of the horizontal or vertical grid scan flight path. For example, the flight path for navigating the structure 215 may be sub-divided into plural sections, e.g., rectangle regions, wherein the flight paths are separately navigable within each of the one or more pre-defined regions. For example, FIG. 5A shows two pre-defined areas 520, 521 defined on the target structure 215 to accommodate the rendering of each example overlay image 221, 222, respectively, of the target image 212' of FIG. 2B.

Thus, according to the predetermined flight path, the drone 99 may continuously traverse two smaller areas, e.g., an first area 520(521) within which the drone 99 is commanded to render the first image 221 while traversing a horizontal grid scan; and a second smaller area 521(520) within which the drone 99 is commanded to render the second image 222 using the grid scan.

In additional embodiments, based on the computer vision functionality, the navigable flying path of the drone may be refined in real time. Further, with computer vision, or like video processing and pattern recognition technology, the mobile device controller evaluates the painting results with reference to the target images/paintings.

As the drone traverses its programmed flight path, at any current drone location along the rendering flight path, the drone detects a programmed command signal to apply paint of a programmed color or color blend to the target structure and responsively initiates action to activate the on-board equipped paint or fluid dispensing system to apply a paint of a color or color blend shown in the overlaid target image as shown in the new target image 212'. In one embodiment, the timing for triggering the painter is programmed and correlated to the drone's position on the flying path.

In one embodiment, as commanded via the program run at the drone, the drone automatically activates a spray nozzle(s) to mix and/or spray paint of a particular color or color blend at a current location on the target structure for a particular duration. The UAV processor device is thus responsive to a received paint command and a color blend value if a non-primary color is to be applied. It is understood that the command to trigger an application of paint to the drone may include a precise color, e.g., as a function of RGB color paint percentages for rendering a particular color and an amount or duration of the color paint to be applied.

Returning to FIG. 4, at 440, a determination is then made as to whether the drone has completed traversing the flight path and the painting of the target image on the target structure, e.g., has reached a final coordinate of the desired image. If not, the process continues at step 435 to continue executing the painting work along the rendering path. Otherwise, at 440, if the drone has completed traversing the flight path and the painting of the target image on the target structure, then at 450, the drone generates a completion signal which is communicated wirelessly from the drone to mobile device base station to indicate to the mobile device to perform a comparison which is initiate at step 125, FIG. 1A.

Figure 7:
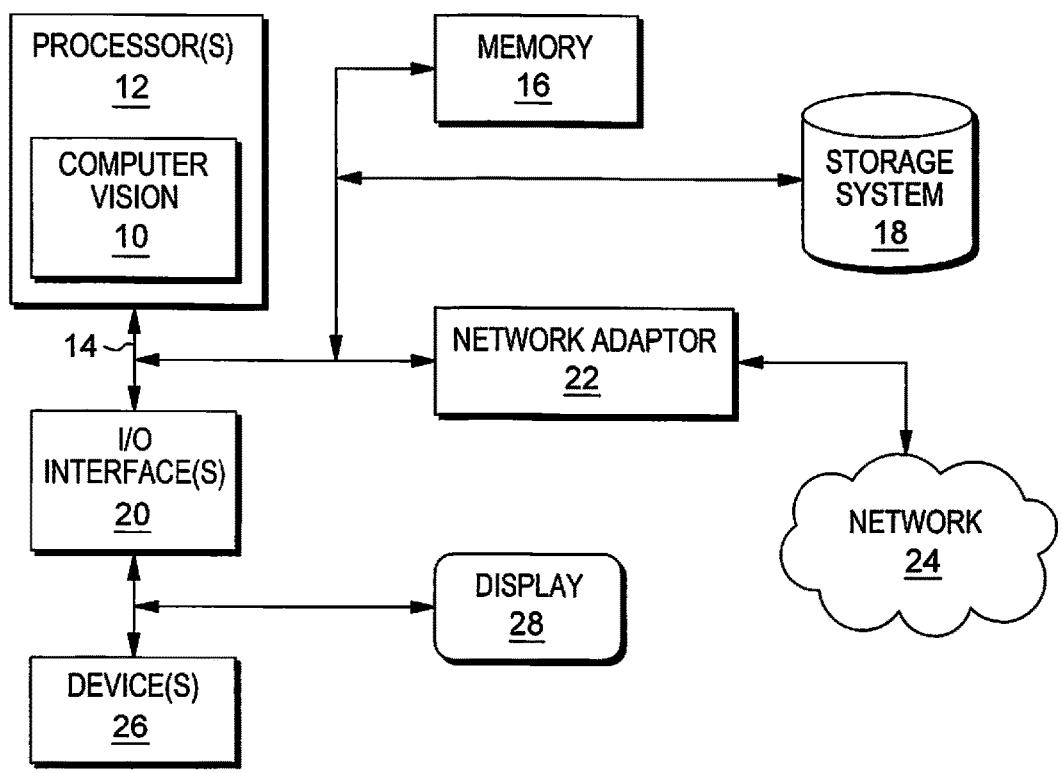
FIG. 7 depicts an exemplary hardware configuration for performing methods such as described herein.

FIG. 7 illustrates a schematic of an example computer or processing system, such as a mobile phone device, that is programmed to perform the method steps for controlling a UAV to paint a structure as described herein with respect to FIGS. 1A-1B and 4 in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the computer vision functionality for UAV navigation and paint application methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A painting system comprising:
   a mobile device having a processor configured to receive a digital image of a target structure, said received digital image of said target structure including an overlay of a visual image desired to be physically rendered on said target structure;
   an unmanned aerial vehicle (UAV) having a paint fluid dispensing system provided thereon;
   a controller device at said UAV configured to receive instruction signals for controlling real time navigating of said UAV to a target location at said target structure;
   said processor of said mobile device obtaining real-time images of said UAV relative to the target structure for recognizing a location of said UAV relative to said target structure and for generating said instruction signals
   to configure said UAV to navigate said target structure by traversing said structure along a flight path, and
   said processor of said mobile device generating further instruction signals
   to configure said UAV controller to automatically actuate said paint fluid dispensing system to apply paint fluid at a location on the target structure corresponding to said visual image overlay of said received digital image while navigating said target structure along said flight path, said processor of said mobile device using said obtained real-time images of said UAV relative to the target location for real-time refining said instruction signals for traversing said target structure and refining said further instruction signals for controlling said paint fluid dispensing system to apply said paint, wherein said UAV paints the desired visual image on said target structure.

2. The painting system as claimed in claim 1, wherein said processor of said mobile device runs a computer vision processing system configured to obtain said real-time images of said UAV relative to the target location and for said generating and refining said instructions signals for real time navigating of said UAV and communicating said instructions signals to said UAV and for said generating and refining said further instruction signals for controlling said paint fluid dispensing system to apply said paint and communicating said further instruction signals to said UAV.

3. The painting system as claimed in claim 2, wherein said computer vision processing system comprises an image capture device for initially obtaining said digital image of the target structure,
   said mobile device comprising: a processor device configured to run an application to edit said obtained digital image of the target structure and receive, from a user, said overlay of the desired visual image onto said obtained digital image via a display of said mobile device.

4. The painting system as claimed in claim 3, wherein said processor device at said mobile device is further configured to:
   run an application to generate flight path information for said UAV to traverse said target structure according to said flight path, said generated flight path information including initial location coordinates and final location coordinates corresponding to a pixel coordinate system of said mobile device display.

5. The painting system as claimed in claim 4, wherein to generate said flight path information, said controller device at said UAV is configured to:
   receive a signal to locate said UAV to a first position, said first position corresponding to a first location of said UAV displayed via a mobile device display;
   receive a further signal to command said UAV to fly a physical distance in a single direction for a pre-determined time duration from the first position to a second position, said second position corresponding to a second location of said UAV displayed via the mobile device display;
   determine, via the processor device at said mobile device, a pixel distance between the first and second locations of the UAV displayed via said mobile device display corresponding to the physical difference between the first UAV position and second UAV position;
   compare the pixel distance to a predetermined pixel distance threshold; and
   program said UAV with flying directions for said UAV to traverse said target structure at said pre-determined time duration increments if said pixel distance is less than the predetermined pixel distance threshold.

6. The painting system as claimed in claim 3, wherein said image capture device is configured to:
   capture an image of the target structure having said painted desired visual image thereon, said computer vision processing at said mobile device further configured to:
   compare the captured image of the target structure having the painted visual image thereon with the received digital image of the target structure having the corresponding desired visual image overlayed thereon to determine need for additional painting by said UAV on the target structure.

7. The painting system as claimed in claim 6, wherein responsive to determining a need for additional painting by said UAV, said processor device of said mobile device configured to:
communicate wireless instruction signals for receipt at said UAV to navigate said UAV to a particular location at the target structure, and automatically activate said UAV to traverse said target structure and activate said paint fluid dispensing system to apply a paint color to said particular location at said target structure according to said desired visual image.

8. The painting system as claimed in claim 7, wherein based on comparison results between the visual image painted by the UAV on said target structure with a corresponding desired visual image overlay of the received digital image at said mobile device display, automatically determine one or more difference regions on the target structure, wherein the UAV is navigated along a path to traverse a difference region to modify said image within said difference region.

9. The painting system as claimed in claim 7, wherein said mobile device and said UAV is configured to iteratively repeat said navigating to a target position, said traversing said target structure along the flight path, and said activating said paint fluid dispensing system to apply a paint color to said particular location at said target structure until the desired visual image is painted on said target structure.

10. A method for painting a target structure comprising:
receiving, at a processor of a mobile device, a digital image of a target structure, said received digital image of said target structure including an overlay of a visual image desired to be physically rendered on said target structure;
configuring a controller device of an unmanned aerial vehicle (UAV) to receive navigation instruction signals for real time navigating said UAV to a target location at the target structure, said UAV having a paint fluid dispensing system provided thereon;
obtaining, at said processor of said mobile device, real-time images of said UAV relative to the target structure for recognizing a location of said UAV relative to said target structure and for generating said navigation instructions
to configure said UAV to traverse said target structure along a flight path; and
generating, by said processor of said mobile device, further instruction signals
to configure said UAV controller device to automatically activate said paint fluid dispensing system during said traversal along the flight path to apply a paint fluid on the target structure corresponding to said visual image overlay of said received digital image while navigating said target structure along said flight path, said processor of said mobile device using said obtained real-time images of said UAV relative to the target location for real-time refining said navigation instruction signals for traversing said target structure and refining of said further instruction signals for controlling said paint fluid dispensing system to apply said paint, wherein said UAV paints the desired visual image on said target structure.

11. The method as claimed in claim 10, further comprising:

configuring, by said processor of said mobile device, a computer vision processing system to obtain said real-time images of said UAV relative to the target structure and for said
generating and refining said navigation instructions signals for said real-time navigating of said UAV and communicating said instructions signals to said UAV for real time navigating said UAV to the target location and for said generating and refining said further instruction signals for controlling said paint fluid dispensing system to apply said paint and communicating said further instruction signals to said UAV.

12. The method as claimed in claim 11, wherein said computer vision processing system at said mobile device comprises an image capture device for initially obtaining said digital image of the target structure, said method comprising:
obtaining, via the image capture device, an image of the target structure to be painted; and
overlaying by a user, using an image editing program, said desired visual image on said obtained digital image of said target structure via a display interface of said mobile device.

13. The method as claimed in claim 12, further comprising:
generating, via the processor device at said mobile device, flight path information for said UAV, said flight path information configuring said UAV to traverse said target structure according to said flight path, said generated flight path information including initial position coordinates and final position coordinates corresponding to a pixel coordinate system of said mobile device display interface.

14. The method as claimed in claim 13, wherein the generating of flight path information for said UAV comprises:
receiving, at the controller device of said UAV, a signal to locate said UAV to a first position, said first position corresponding to a first location of said UAV displayed via a mobile device display interface;
receiving a further signal to command said UAV to fly a physical distance in a single direction for a pre-determined time duration from the first position to a second position, said second position corresponding to a second location of said UAV displayed via the mobile device display;
determining, via the processor device at said mobile device, a pixel distance between the first and second locations of the UAV displayed via said mobile device display corresponding to the physical difference between the first UAV position and second UAV position;
compare the pixel distance to a predetermined pixel distance threshold; and
program said UAV with flying directions for said UAV to traverse said target structure at said pre-determined time duration increments if said pixel distance is less than the predetermined pixel distance threshold.

15. The method as claimed in claim 12, wherein the processor device of said mobile device performs:
capturing, via said image capture device, an image of the target structure having said painted desired visual image thereon; and
comparing, using said computer vision processing system, the captured image of the target structure having the visual image painted thereon by the UAV thereon with the received digital image having the corresponding desired visual image overlay to determine need for additional painting by said UAV on the target structure.

16. The method as claimed in claim 15, further comprising:
responsive to determining a need for additional painting by said UAV on the target structure:
communicating wireless instruction signals from said mobile device for receipt at said UAV to navigate said UAV to a particular location at the target structure; and
automatically activating said paint fluid dispensing system to apply a paint color to said particular location at said target structure corresponding to said desired visual image.

17. The method as claimed in claim 16, wherein based on comparison results between the visual image painted by the UAV on said target structure with a corresponding desired visual image overlay of the received digital image at said mobile device display,
automatically determining one or more difference regions on the target structure, wherein the UAV is navigated along a path to traverse a difference region to modify said image within said difference region.

18. The method as claimed in claim 16, further comprising:
iteratively repeating said navigating said UAV to a target position, said traversing said target structure along the flight path, and said activating said paint fluid dispensing system to apply a paint color to said particular location at said target structure until the desired visual image is painted on said target structure.

19. A method comprising:
initially obtaining, via an image capture device of a mobile device, a digital image of a target structure, said obtained digital image of the target structure including an overlay of a desired visual image via a display of said mobile device;
configuring a computer vision processing system running at a mobile device to obtain real-time images of an unmanned aerial vehicle (UAV) relative to a target structure;
generating, by a processor device running at said mobile device base station, navigation instructions signals for real time navigating said UAV to a target location at the target structure, said UAV having a paint fluid dispensing system provided thereon, said target location corresponding to a location where said desired visual image is to be painted;
generating, by the processor device running at said mobile device base station, a flight path for said UAV to traverse said target structure and communicating said instructions signals to navigate said UAV to traverse said target structure along the flight path; and
generating further instructions signals from said processor device to configure said UAV to automatically activate said paint fluid dispensing system during said traversal along the flight path to apply a paint fluid on the target structure, wherein said UAV paints said desired visual image on said target structure.

20. The method as claimed in claim 19, wherein prior to said real time navigating said UAV, said method further comprising:
editing by a user, at said mobile device, said obtained digital image of the target structure to overlay the desired visual image onto said obtained digital image of said target structure via a display of said mobile device.

21. The method as claimed in claim 19, wherein the generating of a flight path for said UAV comprises:
communicating, from the mobile device base station to a controller device of said UAV, a signal to locate said UAV to a first position, said first position corresponding to a first location of said UAV displayed via a mobile device display interface;
communicating, from the mobile device base station to a controller device of said UAV, a further signal to command said UAV to fly a physical distance in a single direction for a pre-determined time duration from the first position to a second position, said second position corresponding to a second location of said UAV displayed via the mobile device display;
determining, via the processor device at said mobile device, a pixel distance between the first and second locations of the UAV displayed via said mobile device display corresponding to the physical difference between the first UAV position and second UAV position;
compare the pixel distance to a predetermined pixel distance threshold; and program said UAV with flying directions for said UAV to traverse said target structure at said pre-determined time duration increments if said pixel distance is less than the predetermined pixel distance threshold.

* * * * *